United States Patent [19]
Rouchon et al.

[11] Patent Number: 5,971,572
[45] Date of Patent: Oct. 26, 1999

[54] DEVICE FOR ANGULARLY POSITIONING A MASS RELATIVE TO A HORIZONTAL SUPPORT AXIS AND A LIGHTING APPARATUS PROVIDED WITH SUCH A DEVICE

[75] Inventors: Jean-Jacques Rouchon, Maisons Alfort; Alain Verdier, Saint Just Saint Rambert, both of France

[73] Assignee: ALM, Romainville, France

[21] Appl. No.: 08/913,418

[22] PCT Filed: Jan. 14, 1997

[86] PCT No.: PCT/FR97/00062

§ 371 Date: Sep. 15, 1997

§ 102(e) Date: Sep. 15, 1997

[87] PCT Pub. No.: WO97/26433

PCT Pub. Date: Jul. 24, 1997

[30] Foreign Application Priority Data

Jan. 19, 1996 [FR] France .................................. 96 00623

[51] Int. Cl.[6] .......................................................... F21S 1/04
[52] U.S. Cl. .......................... 362/404; 362/804; 362/33; 362/402
[58] Field of Search ..................................... 362/401, 402, 362/33, 404, 804, 418, 419, 427, 424

[56] References Cited

U.S. PATENT DOCUMENTS 5,025,359   6/1991  Saluja ...................................... 362/402

Primary Examiner—Sandra O'Shea
Assistant Examiner—Marshall Honeyman
Attorney, Agent, or Firm—Young & Thompson

[57] ABSTRACT

A device for the angular positioning of a mass with respect to a horizontal support axis includes a support arm intended to carry the mass and the mounted angularly displaceable about the support axis and the balancing device for balancing the arm connected thereto and cooperating with an elastic return member adapted to apply to a point of the support arm a mass balancing moment opposed to the moment generated by the weight of the mass. The assembly of the balancing member and the elastic return device is mounted oscillating on an oscillation axis parallel to the support axis and situated at a fixed distance therefrom so as to be orientated permanently towards the point during angular displacements of the support arm.

13 Claims, 4 Drawing Sheets

DEVICE FOR ANGULARLY POSITIONING A MASS RELATIVE TO A HORIZONTAL SUPPORT AXIS AND A LIGHTING APPARATUS PROVIDED WITH SUCH A DEVICE

BACKGROUND OF THE INVENTION

The present invention relates to a device for angularly positioning a mass relative to a horizontal support axis, and in particular to a device for positioning a light of a light apparatus for operating rooms.

It also relates to lighting apparatus provided with such a device.

DESCRIPTION OF THE RELATED ART

There are known devices for angularly positioning a mass relative to a horizontal support axis, of the type comprising a support arm adapted to carry said mass and mounted angularly displaceably about said support axis, and a balancing member for said arm connected to the latter and coacting with a resilient return member adapted to apply to a point on the support arm a balancing moment for the mass opposing the moment engendered by the weight of the latter.

In lighting apparatus provided with such devices, the balancing member is constituted by a chain connected by one of its ends to the support arm and by its other end to the resilient return member.

The resilient return member is constituted by a fixed spring whose general axis is disposed perpendicular to the support axis.

The device is moreover provided with an angular return constituted by a roller on which the chain bears, such that the force exerted by the latter on the spring will be parallel to the longitudinal axis of the spring no matter what the position of the support arm.

Because of their construction, devices of this type do not permit stable angular positioning of the light about its horizontal support axis over a range of 360°.

Thus, when the chain bearing against the roller forms an angle less than about 160°, the friction between the chain links and the roller increases, which tends to unbalance the support arm.

Moreover, the limit position for the light is reached when the chain forms an angle of 180°, that is, is rectilinear. Thus, beyond this position, the chain is no longer in contact with the roller and thereafter exerts a force in an angular direction offset from the longitudinal axis of the spring, which also tends to make the balancing less effective.

Devices of this type also cause irregular displacement of the support arm about its support axis due to the irregular displacement of the chain against the roller.

SUMMARY OF THE INVENTION

The invention seeks to overcome these drawbacks by providing a device for angular positioning of a mass relative to a horizontal support axis, permitting regular angular displacement of the mass as well as balancing of this latter no matter what its angular position.

It therefore has for its object a device for angular positioning of a mass relative to a horizontal support axis of the mentioned type, characterized in that the assembly constituted by the balancing member and the resilient return member is mounted oscillably about an axis of oscillation, parallel to the support axis and located at a fixed distance from the latter, so as to permanently orient itself toward said point during angular displacements of the support arm.

The invention may also comprise one or several of the following characteristics:

the resilient return member comprises a spring disposed at least in part in a housing mounted oscillably on said oscillation axis and provided with a bottom delimiting a bearing surface for an end region of the spring, whose opposite end region coacts with the balancing member of the support arm;

the balancing member comprises a rectilinear rod passing through an opening provided in the bottom of the housing and axially displaceable in the latter under the control of the support arm;

the assembly constituted by the balancing member and the resilient return member is disposed in a frame, said oscillation axis being defined by two lugs engaging in two respective bearings, provided one in the external wall of the housing and the other in the internal wall of the frame;

the support axis is constituted by a shaft prolonged axially by an eccentric crank pin on which is articulated the balancing member;

the shaft is prolonged radially in the direction of the crank pin in a direction substantially perpendicular to the support arm so as to exert on the latter, under the influence of the balancing member, a maximum balancing moment when the support arm is in a horizontal position and a minimum balancing moment when the support arm is in a vertical position;

the end of the shaft opposite the crank pin is secured to the support arm;

the frame is integrated with the support arm; the end of the shaft opposite the crank pin being secured to a support member for said arm;

the spring is a conical ring compression spring of the Belleville type;

the spring is a visco-elastic elastomer compression spring;

the assembly constituted by the balancing member and the resilient return member is moreover mounted angularly displaceably about a pivot axis perpendicular to said oscillation axis;

the mass is constituted by a light mounted angularly displaceably on the support arm.

The invention also has for its object a lighting apparatus for an operating room comprising a suspension arm for a prism light articulated on an overhead light and on which is mounted angularly displaceably said light, characterized in that it comprises a device for angularly positioning a mass such as defined above so as angularly to position and to balance the light relative to the suspension arm.

BRIEF DESCRIPTION OF THE DRAWINGS

Other characteristics and advantages of the invention will become apparent from the following description, given by way of non-limiting example, with reference to the accompanying drawings, in which.

DESCRIPTION OF THE PREFERRED EMBODIMENTS

Figure 1:
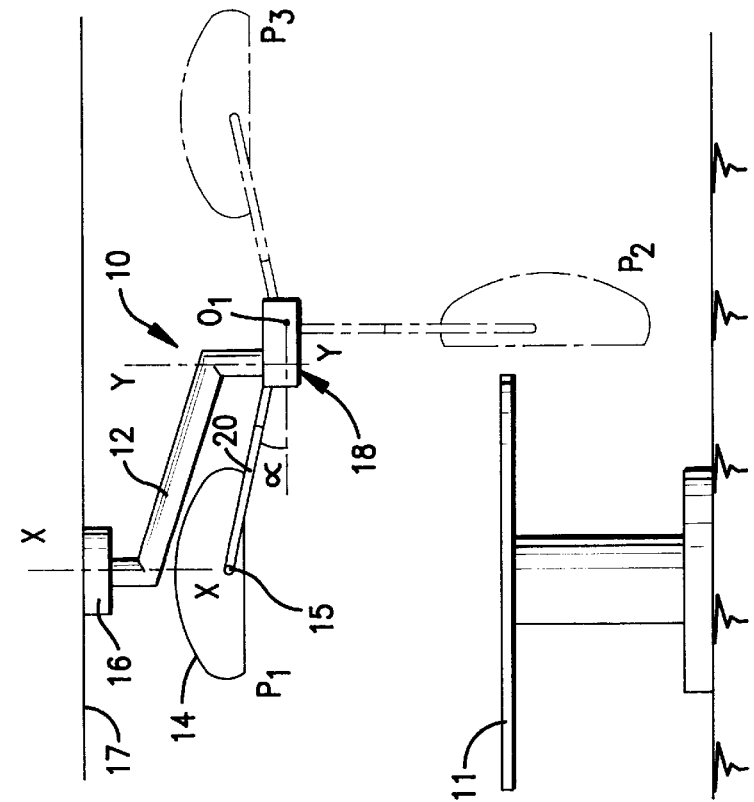
FIG. 1 is a schematic view of a lighting apparatus for an operating room, provided with a device according to the invention, in different angular positions of the light.

In FIG. 1 has been shown a lighting apparatus for an operating room, designated by reference numeral 10, adapted to position precisely the light on a patient stretched out on an operating table 11.

The lighting apparatus 10 comprises a suspension arm 12, in the form of a crank, of a light 14 of the prism type. The arm 12 can pivot about a principal axis X-X articulated on the overhead light 16, itself fixed on the ceiling 17 of the operating room by means of screw-threaded rods.

The light 14 is connected to the suspension arm 12 by a device for angularly positioning the light 14 relative to a horizontal support axis $O_1$ perpendicular to the plane of FIG. 1.

This angular positioning device, designated by reference numeral 18, permits a surgeon to position the light 14, within the limits imposed by the ceiling 17, at any point on a circle about axis $O_1$, and particularly to displace the light 14 from its position P1 shown in full line in FIG. 1, toward the positions P2 and P3 shown in broken lines, according to the type of surgical operation to be performed.

The angular positioning device 18 of the light 14 comprises a support arm 20 mounted angularly displaceably on the suspension arm 12, about the axis $O_1$, and on which the light 14 is articulated about a horizontal axis 15 perpendicular to the arm 20, and a balancing member for the arm 20, not shown in FIG. 1.

The precise description of the angular positioning device 18 of the light 14 will now be given with reference to FIG. 2 and to FIG. 3 on which the arm 20 has been shown schematically by its axis 20-1, which corresponds to the position P1.

Figure 2:
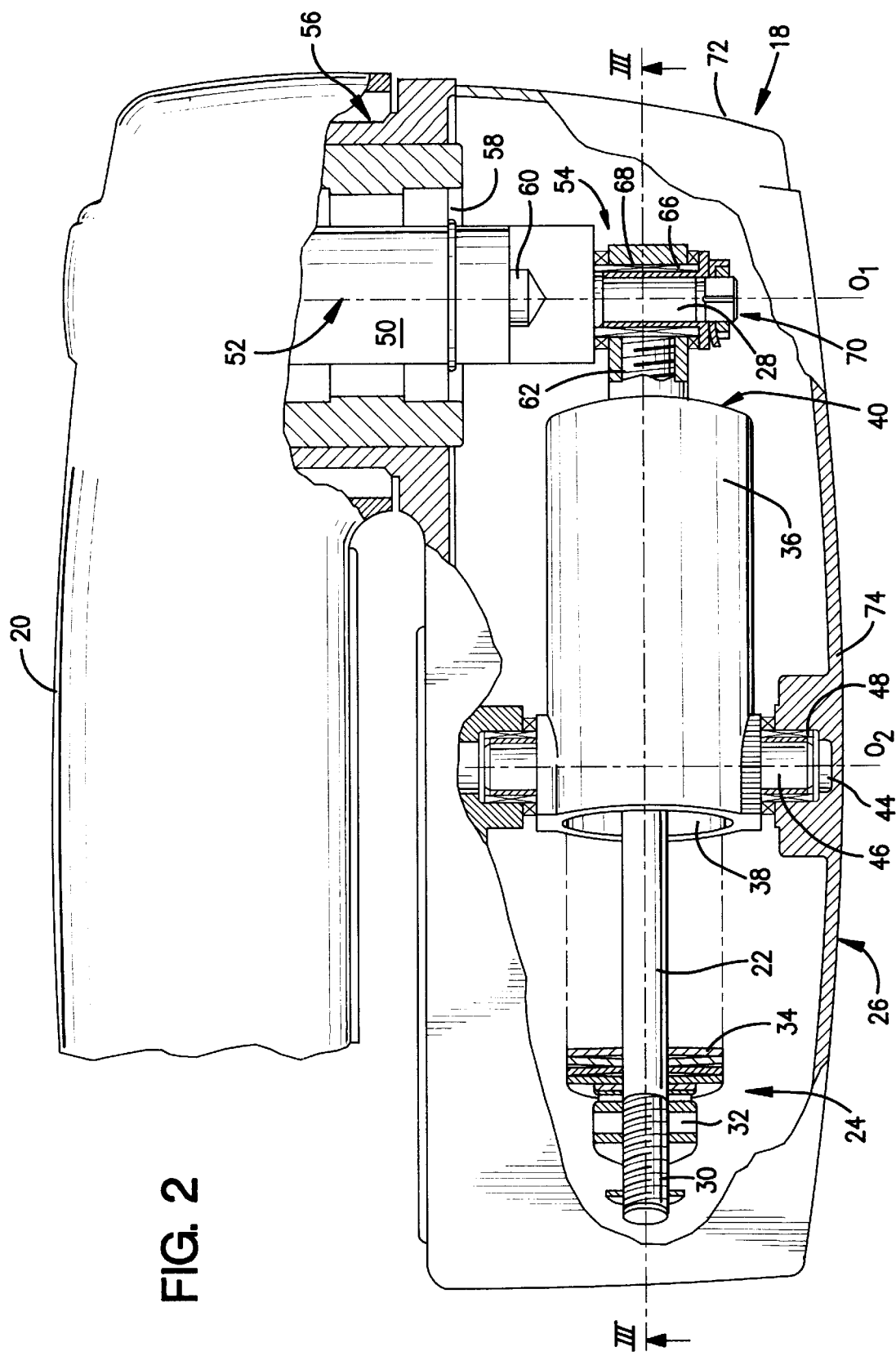
FIG. 2 is an enlarged view from above of a detail of the lighting apparatus of FIG. 1, partially broken away, showing the angular positioning device of the light.

It will be seen in these figures, and in particular in FIG. 2 in which the arm 20 has been partially broken away, that the angular positioning device 18 of the light is constituted by the arm 20, the balancing member 22 and a resilient return member 24. The balancing member and the resilient return member 24 are disposed in a frame 26 fixed on the suspension arm 12 and on which is angularly displaceably mounted the support arm 20, relative to the horizontal support axis $O_1$.

The balancing member 22 is constituted by a rectilinear rod articulated about an axis of articulation M, on a crank 28 extending parallel to the support axis $O_1$ and radially offset relative to the latter, as will be described in greater detail hereafter.

The end of the rod 22 opposite the crank 28 comprises a screw-threaded region 30 on which is screwed a complimentary nut 32 constituting a head on which bears the elastic return member 24.

It will also be seen in these figures that the resilient return member 24 comprises a spring 34 disposed at least in part in a cylindrical housing 36 provided with an open end 38 and a bottom 40 pierced by an opening 42 for the passage of the screw-threaded rod 22. The spring is compressed adjustably between the bottom 40 and the nut 32.

In the illustrated example, the spring 34 is a conical ring compression spring of the Belleville type, but other types of springs can also be used, for example a visco-elastic elastomer compression spring.

The housing 36 is mounted oscillably in the frame 26 under the control of the crank pin 28.

To this end, the internal wall of the frame 26 is provided with two coaxial bearings 44, in which engage two lugs, such as 46, projecting radially from the external wall of the housing 36, with interposition of ball bearings such as 48, for example combined abutment bearings.

There will now be described the structure of the connection between the support arm 20 and, on the one hand, the frame 26 and, on the other hand, the crank pin 28.

For its angular displacement relative to the support axis $O_1$, the arm 20 is secured to one end 52 of a shaft 50 defining the support axis $O_1$. This shaft 50 extends perpendicular to the arm 20 in the direction of the balancing member 22 and of the resilient return member 24 and is prolonged axially by its other end 54, particularly to the arm 20, by the eccentric crank pin 28.

The shaft 50 turns in a cylindrical prolongation 56 of the frame 26 coaxial with this shaft, by means of an assembly of ball bearings 58.

Preferably, the shaft 50 is pierced by conduits 60 for the passage of electrical supply conductors for the light, not shown, and of known type.

As mentioned above, and as shown in detail in FIG. 3, the shaft 50 is prolonged at its end 54 by the crank pin 28, on which is articulated the rectilinear rod 22 and which defines the axis of articulation M.

It will be seen therefore that the shaft 50 constitutes a crank giving rise in the course of its rotation to the displacement of the rod 22, angularly and about its own axis, in the housing 36.

The connection between the rectilinear rod 22 and the crank pin 28 is ensured in the following manner.

The end of the rectilinear rod 22 located adjacent the crank pin 28 comprises a screw thread 62 for screwing a ferrule 64 which is generally cylindrical and pierced by a transverse opening 66 in which is inserted the crank pin 28.

For the rotation of the ferrule 64 relative to the crank pin 28, there is provided an assembly of roller bearings 68 constituted for example by combined bearing-abutment roller bearings. The connection between the ferrule 64 and the crank pin 28 is completed by axial retention means for the crank pin 28 within the ferrule 64, designated by reference numeral 70 and of known type (FIG. 2).

Figure 3:
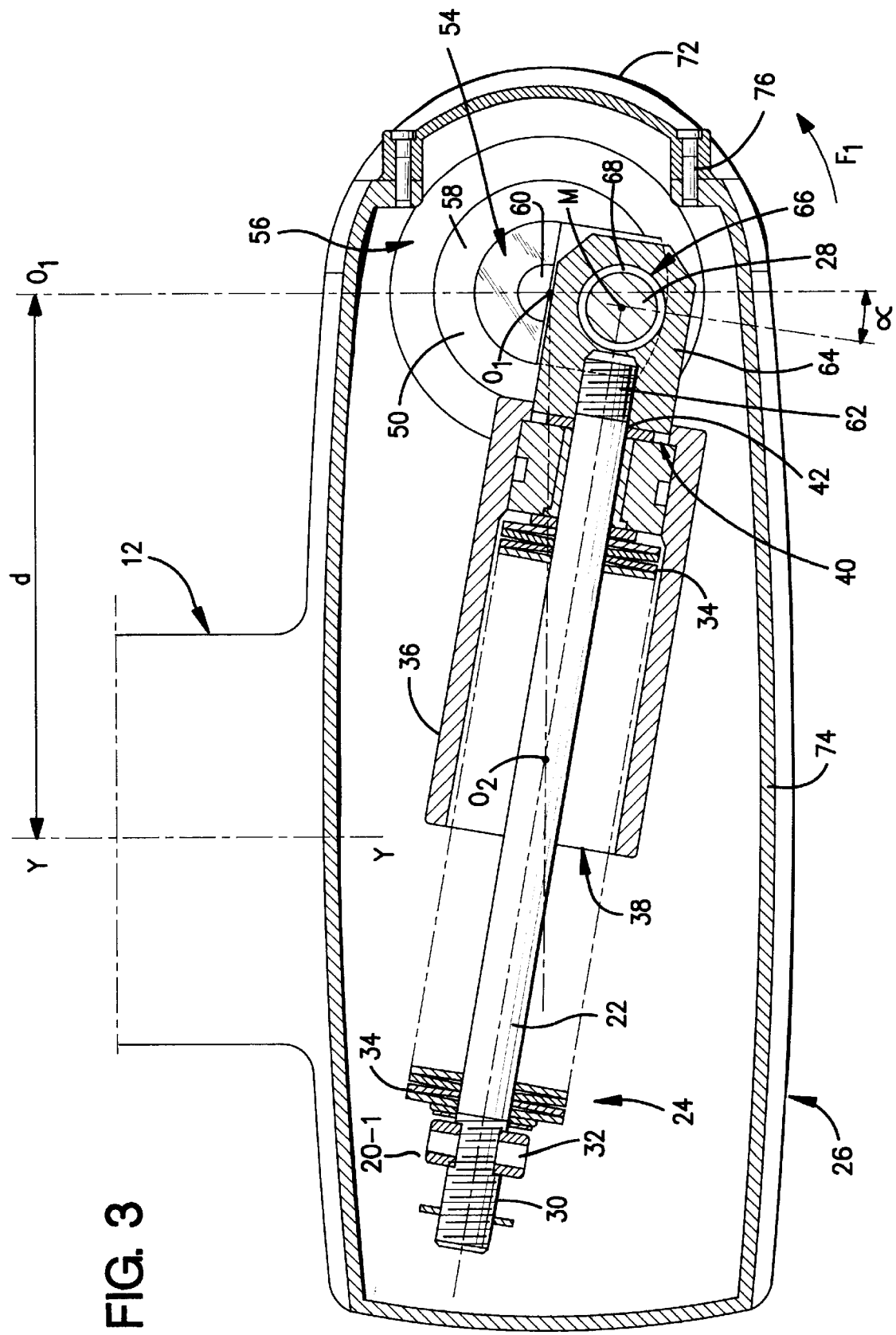
FIG. 3 is a side cross-sectional view on the line III—III of the device of FIG. 2.

It will be seen in FIG. 3 that the frame 26 comprises a cap 72 fixed to the body 74 of the frame 26 by screw securement means 76.

It will be noted that the assembly which has been described, in a position which corresponds to the position P1 of FIG. 1, constitutes a connecting rod-crank assembly, the crank being constituted by the shaft 50 and its crank pin 28, as mentioned above, and the connecting rod being constituted by the rectilinear rod 22 provided with its ferrule 64.

In this position P1, the arm 20 forms an angle α relative to the horizontal of about 10° (FIG. 1) and the straight line joining the support axis $O_1$ and the articulation axis M (FIG. 3) also forms this angle α relative to the vertical.

It will be seen that the weight of the light 14 fixed on the support arm 20 exerts a moment about the support axis $O_1$, which depends in known manner on the angle this support arm forms with the horizontal, which is to say the straight line defined by the horizontal support axis $O_1$ and the axis of oscillation $O_2$ defined by the lugs 46 of the housing 36 received in the bearings 44.

This moment is a maximum when the arm 20 is in one of the horizontal positions and zero when this arm is located in a vertical position, which is to say perpendicular to the straight line joining the two axes $O_1$ and $O_2$.

Moreover, the rod 22, coacting with the spring 34, exerts an opposite balancing moment opposing the moment generated by the light 14. In known fashion, this opposite moment is proportional to the shortening of the spring 34, which is to say is a linear function of the distance between the axes $O_1$ and M (FIG. 3).

Because of the particular construction of the shaft 50, and in particular its eccentric prolongation 28 to the vicinity of the end 54 perpendicularly to the arm 20, this balancing moment is at a maximum when the angle α in FIG. 3 is zero, which corresponds to a horizontal position of the support arm 20.

Moreover, this moment is at a minimum when the rod is located along the straight line defined by the axes $O_1$ and $O_2$, which is to say when the arm 20 is in a vertical position (position P2).

When the support arm 20 is displaced from its position P1 toward its position P2, the shaft 50 causes the rotation of the crank pin 28 in the direction designated by the arrow F1 in FIG. 3 and the displacement of the straight rod 22 toward a position according to the perpendicular line joining the axes $O_1$ and $O_2$, which is to say horizontally, which causes the compression of the spring 34.

It is to be noted that in this position P2, the spring 34 is located in a position in which its compression is more important. However, as mentioned above, the moment exerted by the rod 22 is zero. It therefore has no effect on the support arm 20, which is in a stable vertical position.

When the support arm 20 is displaced from its position P2 toward its position P3, the crank pin 28 is again displaced in the direction of rotation designated by the arrow F1 and the device is located in a symmetrical position relative to the horizontal, from that shown in FIG. 3.

When the support arm 20 is again displaced, from its position P3, in the direction of the arrow F1, toward an unstable vertical position (not shown), the rectilinear rod is again displaced so as to be positioned horizontally and the spring is located in a position in which its compression is minimal. In this position, the zero moment exerted by the rectilinear rod 22 on the support arm 20 combined with the minimum compression of the support 34 permits maintaining the arm 20 in its vertical unstable position.

In the course of the different displacements mentioned above, the rectilinear rod 22 oscillates relative to its axis of oscillation $O_2$. Thus, the assembly constituted by the rectilinear rod 22 and the resilient return member, is permanently oriented, no matter what the angular displacement of the support arm 20, according to the right angle defined by the axis of oscillation $O_2$ and the axis of articulation M of the rectilinear rod 22.

It will be seen therefore that it is possible, by choosing the spring 34 as a function of the forces to be applied to the support arm 20, and by regulating its compression by adjusting the position of the nut 32, to balance permanently, which is to say no matter what the angular position of the light 14 about the support axis $O_1$, the opposing moments so as to stabilize the position of the arm 20.

The device which has been described therefore permits positioning and stabilizing permanently the support arm 20 about 360° relative to the support axis $O_1$.

However, it will be seen in FIG. 1 that the angular swinging of the arm 20 in the highest positions is limited by the presence of the ceiling of the operating room.

There could however be contemplated the provision of the device with a support arm of lesser length to avoid this limitation, but this would be accompanied by a limitation of the lateral swinging.

In the example which has been described, the lateral swinging of the light 14 has been preferred to upward swinging, so as to be able to cover a larger lighting surface.

So as to improve further this lateral swinging, the frame 26 is articulated about a second vertical pivotal axis Y-Y (FIG. 3) of the suspension arm 12, this axis Y-Y being offset a distance d from the support axis $O_1$.

Figure 4:
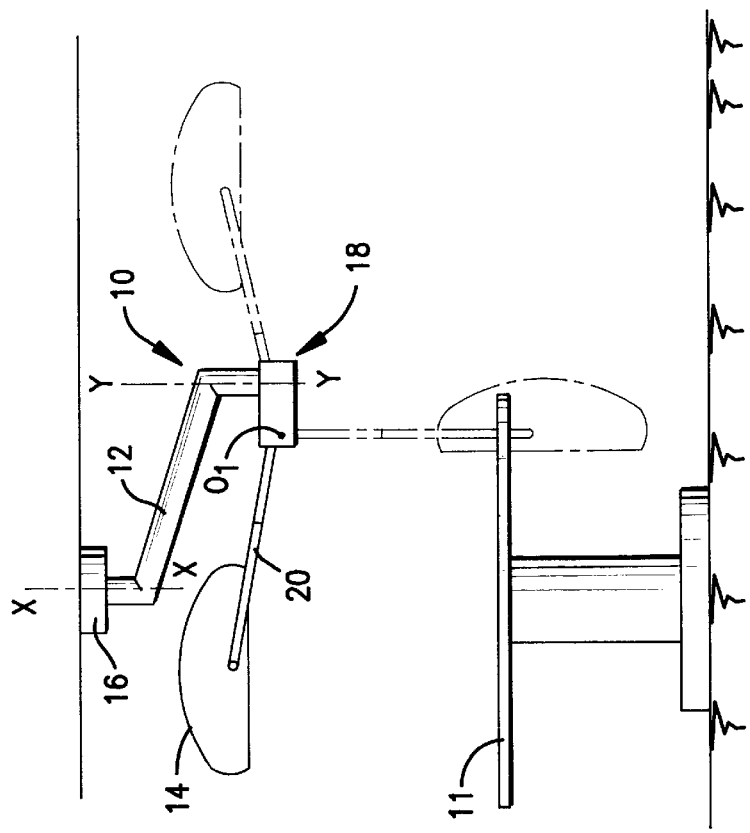
FIG. 4 shows the lighting apparatus of FIG. 1 having been rotated 180° relative to its vertical pivotal axis.

It is thus possible to obtain a translation through a distance equal to 2×d by means of rotation by 180° of the frame 26 relative to the suspension arm 12, as shown in FIG. 4.

It will thus be seen that the angular displacements of the suspension arm 12 relative to the ceiling fixture 16, the support arm 20 relative to a portion of the horizontal axis $O_1$ and on the other hand to the vertical pivoting axis Y-Y, permit displacing the volume of the light engendered by the light 14 over a relatively large area, for each given angular position of the suspension arm 12.

Moreover, the displacement of the light between any two positions takes place in a regular and precise manner, because all the movements are directly guided by rollers interposed between the members constituting the positioning device 18.

In the embodiment which has been described with reference to FIGS. 2 and 3, the assembly constituted by the balancing member and the resilient return member is mounted oscillably in the frame on which is articulated the support arm.

Figure 5:
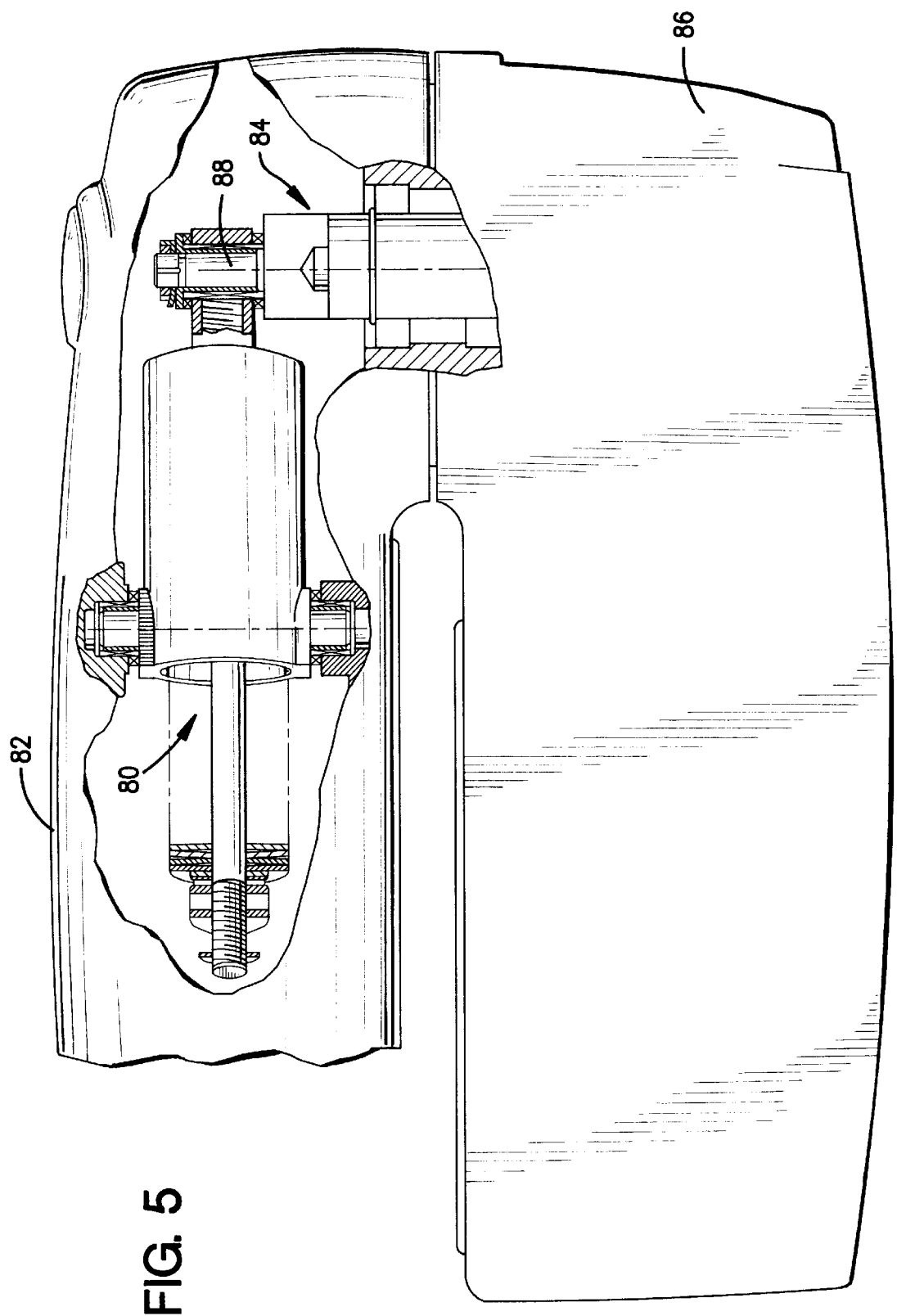
FIG. 5 shows another embodiment of the angular positioning device of the light.

According to another embodiment, shown in FIG. 5, the balancing member and the resilient return member, of a construction similar to those described precedingly and designated by the reference numeral 80, are mounted oscillably within the support arm 82.

The support arm 82 is mounted angularly displaceably about a shaft 84 secured by one of its ends to a support member 86 for the arm, connected to the suspension arm of the lighting apparatus.

The support arm 82 is angularly displaceable relative to the support member 86 and, as before, the end of shaft 84, opposite the support member 86, is prolonged axially by an eccentric crank pin 88 on which is articulated the balancing member 80.

This embodiment, which differs from the embodiment of FIGS. 2 and 3 only by the positioning of the balancing and resilient return members, operates in a similar manner and permits also the regular displacement and balancing of the light no matter what its angular position.

We claim:

1. Device for angularly positioning a mass (14) relative to a horizontal support axis ($O_1$), comprising:

a support arm (20; 82) adapted to carry the mass (14) and mounted angularly displaceably about said support axis ($O_1$), and a balancing member (22; 80) for said arm (20; 82) connected to said arm and coacting with a resilient return member (24) adapted to apply to a point (M) on the support arm (20; 82) a balancing moment for the mass opposing the moment engendered by the weight of said arm, wherein the assembly comprised by the balancing member (22; 80) and the resilient return member (24) is mounted oscillably about an oscillation axis ($O_2$) parallel to the support axis ($O_1$) and located at a fixed distance from the support axis, so as to be permanently oriented toward said point (M) during angular displacements of the support arm (20; 82).

2. Positioning device according to claim 1, wherein the resilient return member (24) comprises a spring (34) disposed at least in part in a housing (36) mounted oscillably on said oscillation axis ($O_2$) and provided with a bottom (40) delimiting a bearing surface for an end region of the spring (34), whose opposite end region coacts with the balancing member (22) of the support arm (20).

3. Positioning device according to claim 2, wherein the balancing member (22; 80) comprises a rectilinear rod (22) passing through an opening provided in the bottom of the housing and axially displaceable in said opening under the control of the support arm (20; 82).

4. Positioning device according to claim 2, wherein the assembly comprised by the balancing member and the resilient return member is disposed in a frame (26),
said oscillation axis ($O_2$) being defined by two lugs engaging in two respective bearings, a first of said two lugs being provided in the external wall of the housing (36) and a second of said two lugs being provided in the internal wall of the frame (26).

5. Positioning device according to claim 1, wherein the support axis ($O_1$) is constituted by a shaft (50; 84) prolonged axially by an eccentric crank pin (28; 88) on which is articulated the balancing member (22; 80).

6. Positioning device according to claim 5, wherein the shaft (50; 84) is prolonged radially in the direction of the crank pin (28; 88) in a direction substantially perpendicular to the support arm (20; 82) arranged and adapted so as to exert on said support arm, under the influence of the balancing member (22; 80), a maximum balancing moment when the support arm (20; 82) is in a horizontal position and a minimum balancing moment when the support arm (20; 82) is in a vertical position.

7. Positioning device according to claim 5, wherein an end of the shaft (50) opposite the crank pin (28) is secured to the support arm (20).

8. Positioning device according to claim 5, wherein the frame is integrated with the support arm (82), and
wherein the end of the shaft (84) opposite the crank pin (88) is secured to a support member for said arm (82).

9. Positioning device according to claim 2, wherein the spring (34) is a Belleville conical disc compression spring.

10. Positioning device according to claim 2, wherein the spring (34) is a visco-elastic elastomer compression spring.

11. Positioning device according to claim 1, wherein the assembly comprised by the balancing member (22) and the resilient return member (24) is mounted angularly displaceably about a pivot axis (Y-Y) perpendicular to said oscillation axis ($O_2$).

12. Positioning device according to claim 1, further comprising the mass, said mass comprising a light (14) mounted angularly displaceably on the support arm (20).

13. Lighting apparatus for an operating room comprising:
a suspension arm (12) for a prism light (14) articulated on a ceiling fixture (16), displaceably said light (14), being angularly mounted on said suspension arm (12),
wherein said lighting apparatus comprises an angular positioning device for a mass according to claim 1 for the angular positioning and balancing of the light (14) relative to the suspension arm (12).

* * * * *